Figure 1:
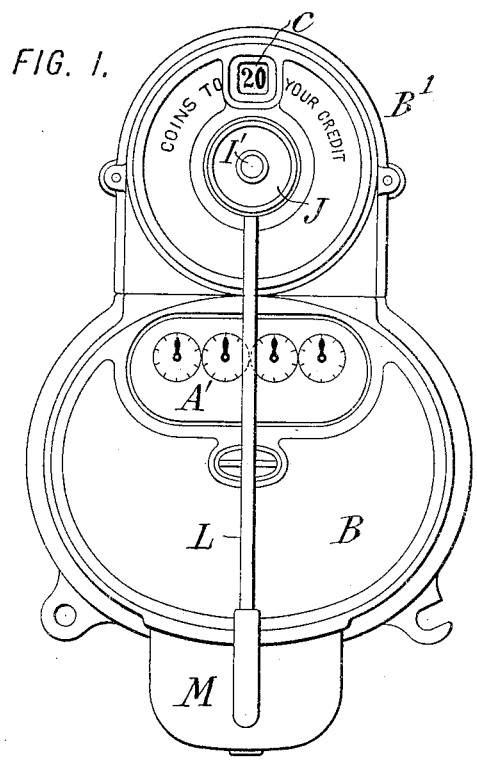

No. 806,722. PATENTED DEC. 5, 1905.
J. J. WOOD.
PREPAYMENT METER.
APPLICATION FILED DEC. 3, 1904.

6 SHEETS—SHEET 1.

WITNESSES:
Fred White
René Ruine

INVENTOR:
James J. Wood,
By Attorneys,
Arthur E. Fraser & Co.

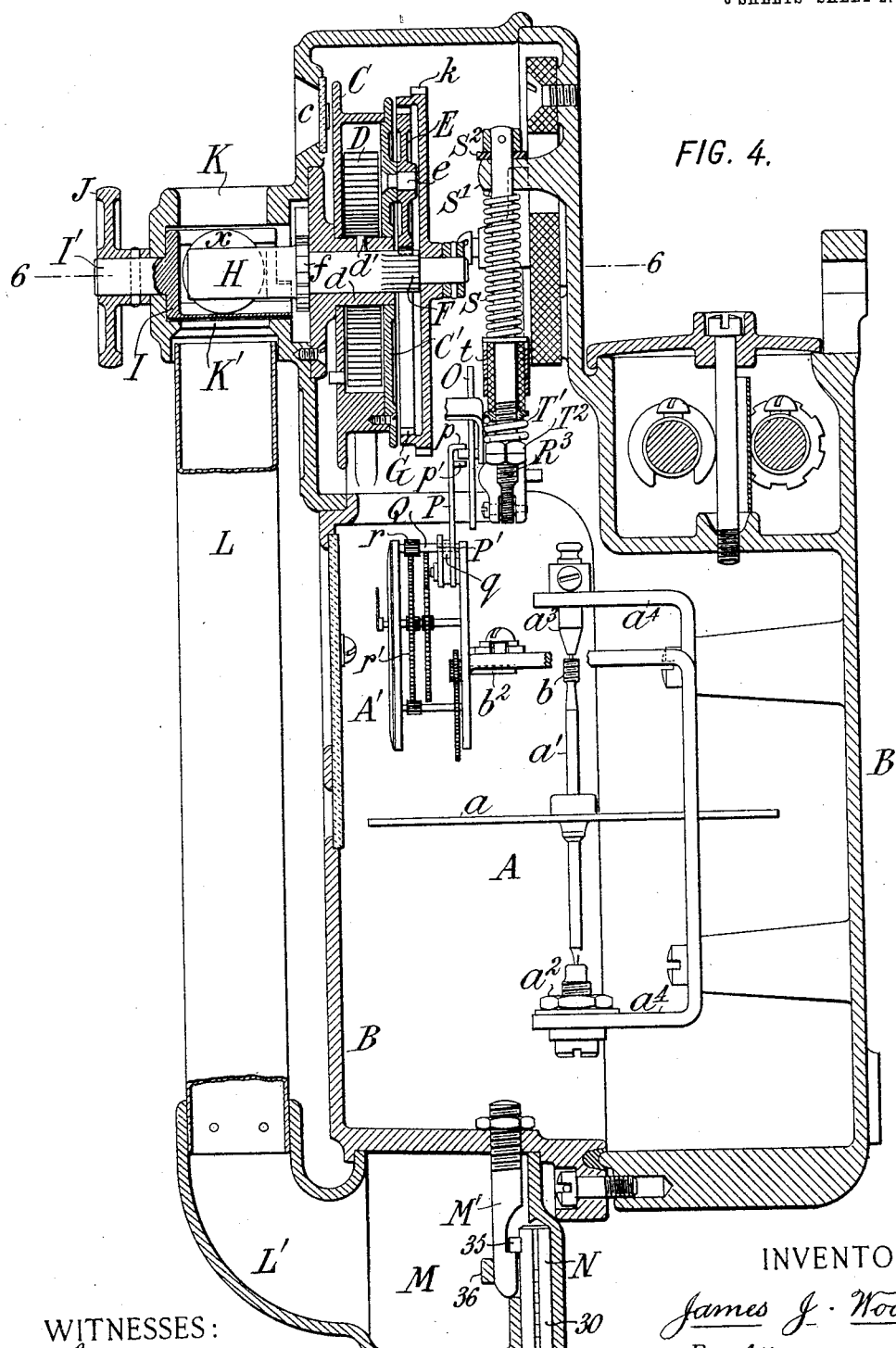

No. 806,722. PATENTED DEC. 5, 1905.
J. J. WOOD.
PREPAYMENT METER.
APPLICATION FILED DEC. 3, 1904.
6 SHEETS—SHEET 3.
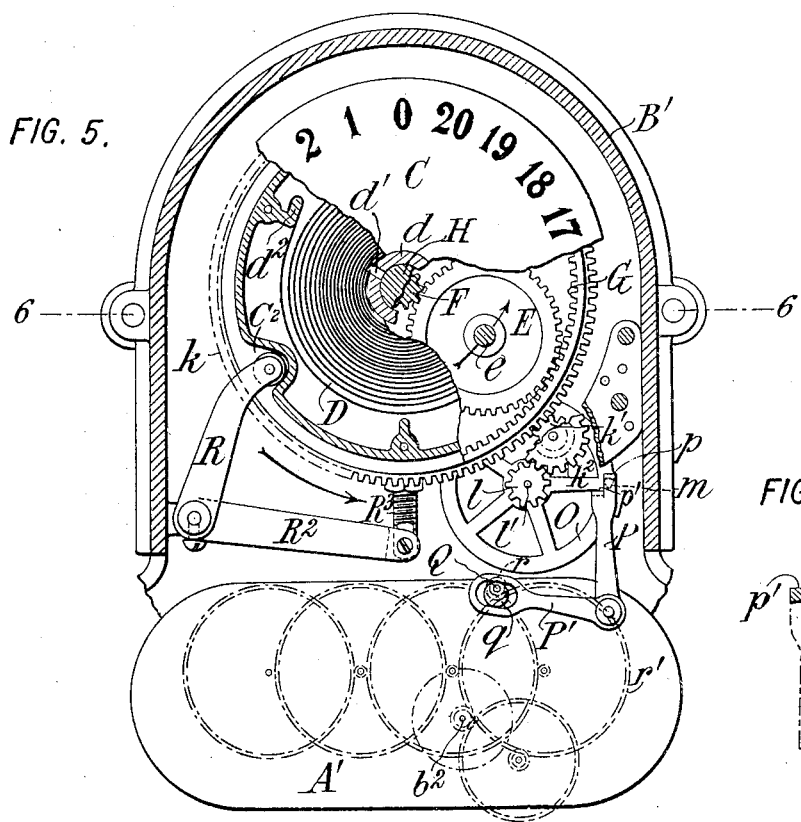
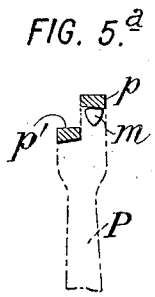
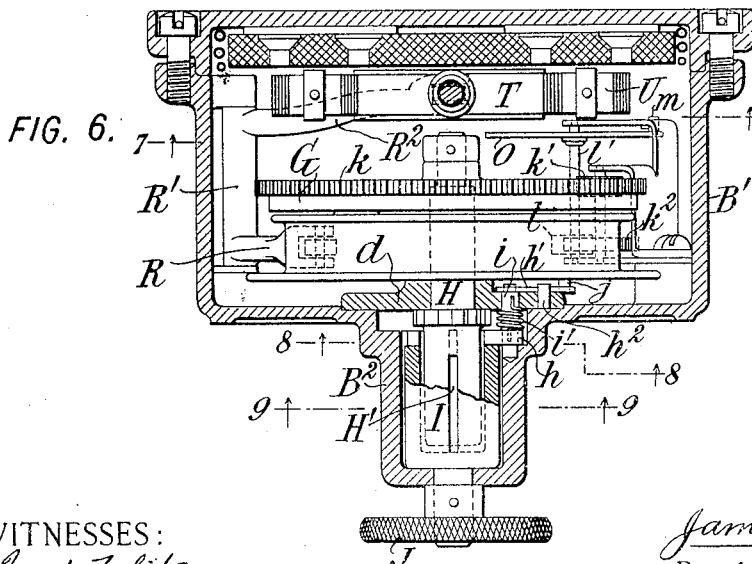
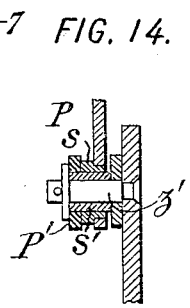
WITNESSES:
Fred White
René Buine
INVENTOR:
James J. Wood,
By Attorneys,
Arthur G. Fraser & Co.

No. 806,722. PATENTED DEC. 5, 1905.
J. J. WOOD.
PREPAYMENT METER.
APPLICATION FILED DEC. 3, 1904.
6 SHEETS—SHEET 4.
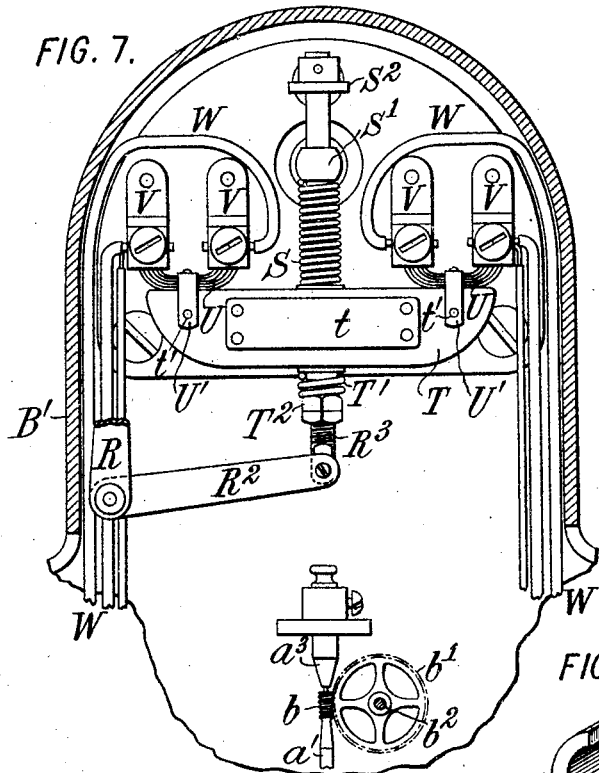
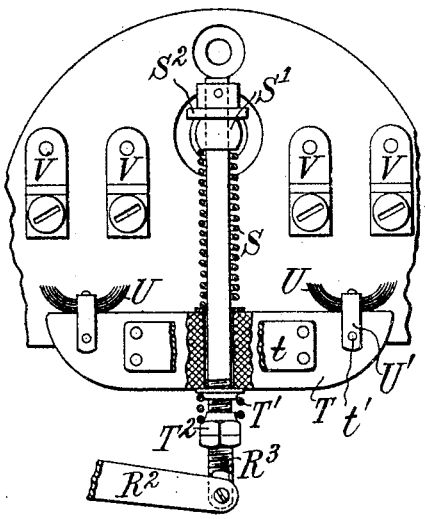
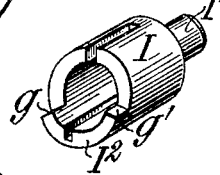
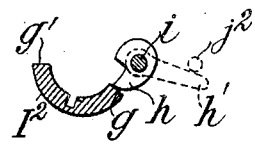
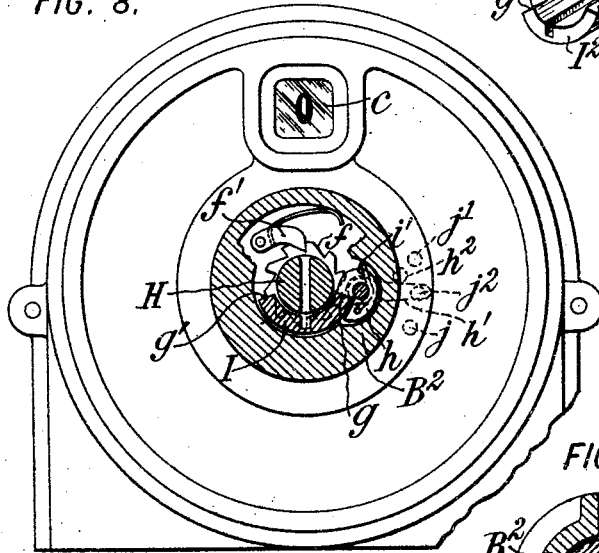
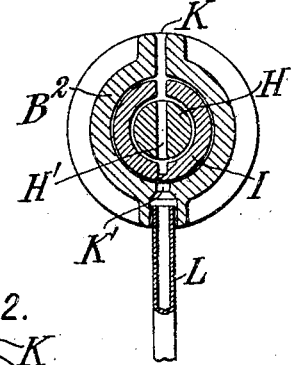
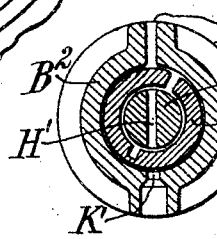
WITNESSES:
Fred White
René Buine
INVENTOR:
James J. Wood,
By Attorneys,
Arthur C. Fraser & Co.

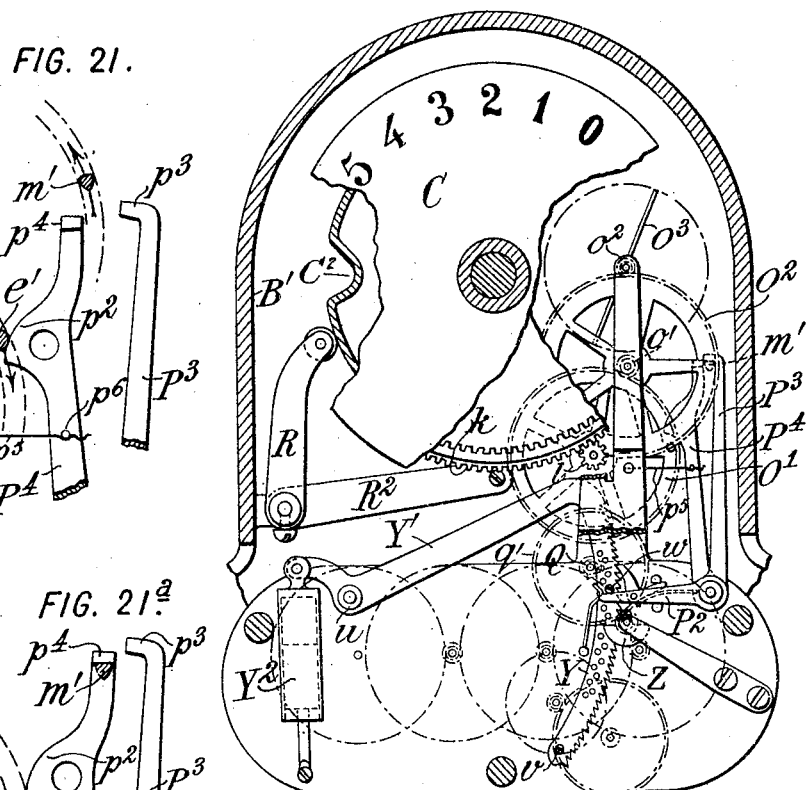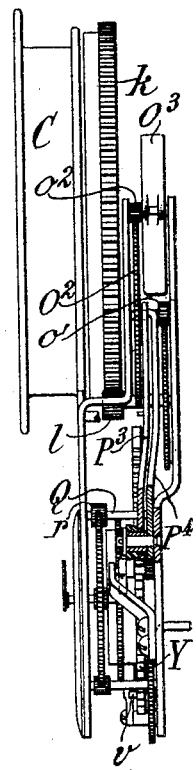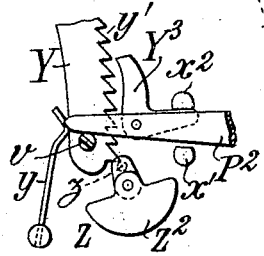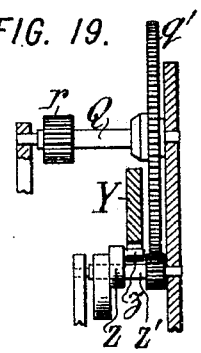

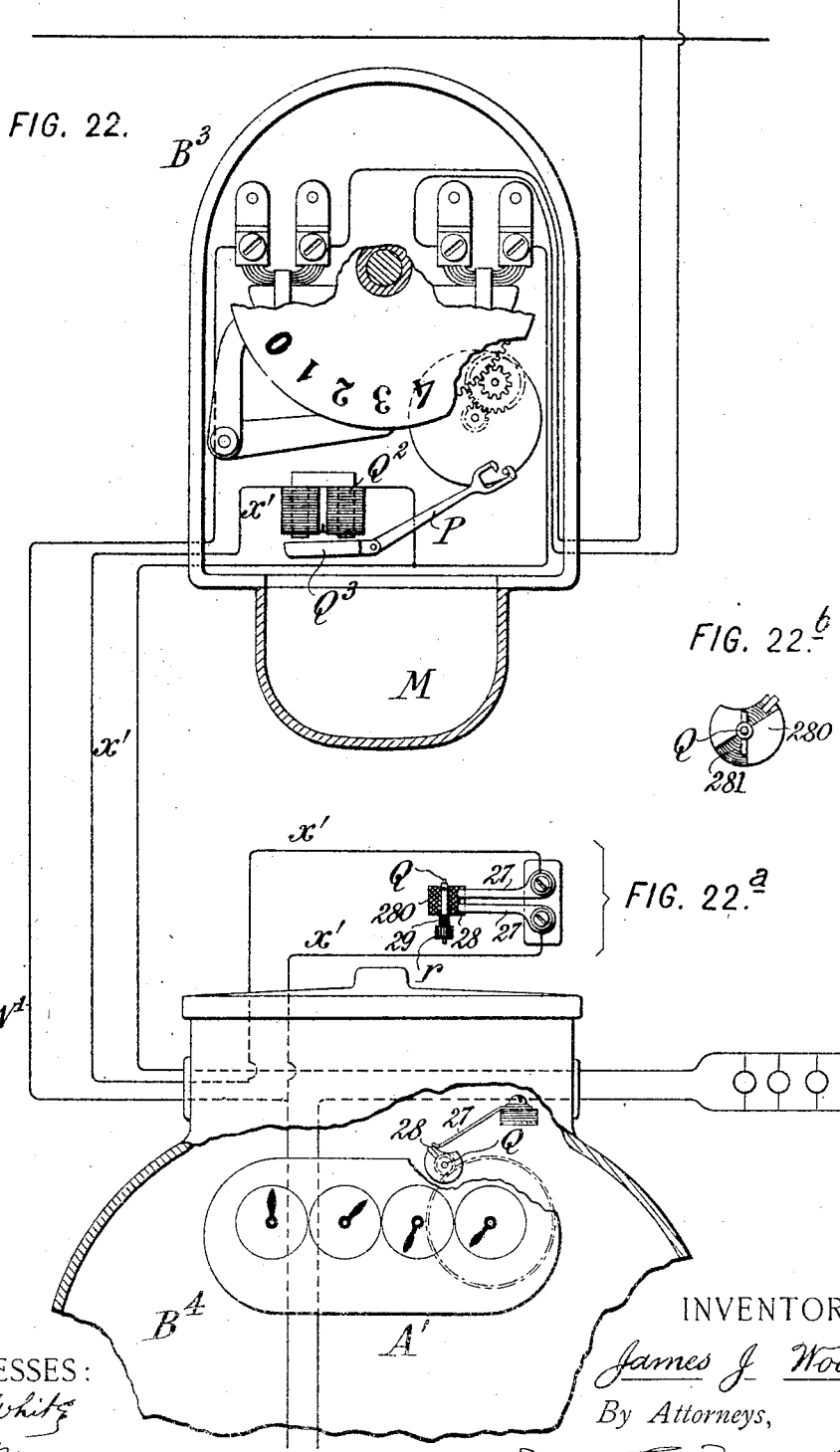

UNITED STATES PATENT OFFICE.

JAMES J. WOOD, OF FORT WAYNE, INDIANA.

PREPAYMENT-METER.

No. 806,722. Specification of Letters Patent. Patented Dec. 5, 1905.

Application filed December 3, 1904. Serial No. 235,412.

*To all whom it may concern:*

Be it known that I, JAMES J. WOOD, a citizen of the United States, residing at Fort Wayne, in the county of Allen and State of Indiana, have invented certain new and useful Improvements in Prepayment-Meters, of which the following is a specification.

This invention relates to meters for measuring electricity, gas, or other commodity which are provided with a coin-receptacle and means for counting up to the credit of the consumer coins, checks, or tokens which he inserts in said receptacle by way of prepayment for the commodity to be used. The operation of the meter has the effect of counting off or diminishing the prepayment credit step by step at a rate proportional to the price charged for the commodity. When the amount prepaid for has been received, as indicated by the progress of the meter, the supply of commodity is cut off automatically—that is to say, in the case of an electric meter the circuit is broken or in the case of a gas-meter a valve is closed to shut off the gas. With such a meter it is necessary that upon insertion of the first coin the supply of the commodity should be turned on. As each subsequent coin is inserted the prepayment mechanism should assume a position corresponding with the number of coins to the credit of the consumer. When as many coins have been inserted as equals the capacity of the prepayment mechanism, the opening through which coins are introduced should be closed, so that no more coins can be inserted, and as the totalizing mechanism of the meter advances in proportion to the consumption of the commodity it must operate the prepayment mechanism in manner contrary to its original operation, so that it shall move toward its original or zero position, so that as the amount to the credit of the customer diminishes the prepayment mechanism shall move back toward its initial position, and when finally the entire amount of commodity prepaid for shall have been consumed the prepayment mechanism resumes its initial or zero position, and thereupon cuts off the supply of further commodity. My invention provides an improved and simplified mechanism for performing these successive operations designed to operate with great precision and exactness and to require the minimum of power for operating it to be taken from the totalizing mechanism of the meter.

According to my invention the prepayment mechanism comprises a movable part, which I will call a "credit-indicator," which moves from an initial or zero position step by step in one direction for crediting a customer with the inserted coins and in the contrary direction for debiting him with the value of the commodity used. This indicator has imparted to it a constant stress or torque, tending to move it toward its zero position. The indicator is preferably a rotative part, as a disk or cylinder, and pressed in one direction by a spring. A coin-actuated device is provided, which upon the insertion of a coin connects an operating-handle with a counting-up device, so that upon the moving of said handle the counting-up device is moved, and this device in turn acts upon the indicator to displace it one step away from its zero position. The coin-actuated device comprises, preferably, a coin-driving part connected to the operating-handle, which by the insertion of a coin is locked thereby to a coin-driven part, which latter actuates the counting-up device. The coin having performed its function is released and falls through a conduit into a coin-receptacle. The credit-indicator is marked with successive figures, which by its movement are carried past an opening or otherwise displayed, so as to indicate the number of coins which have been inserted and which stand to the credit of the customer. The counting-up device comprises epicycloidal gearing in the nature of a sun-and-planet wheel, the coin-driven part serving to turn a pinion which meshes with and drives the planet-wheel and the latter rolling against an intermeshing internal or ring gear held normally stationary is advanced in a circular arc and being pivoted to the credit-indicator turns the latter through the same arc. For debiting the customer with the commodity consumed the credit-indicator is connected with a counting-down device which is under the control of the meter, preferably by being connected to the totalizing mechanism thereof, so that when the totalizing-wheels have turned through a predetermined space corresponding to a certain value unit of the commodity the counting-down device is actuated and determines the movement of the credit-indicator in a backward direction or toward its initial or zero position. In view of the delicate construction of meters usually and the very minute amount of power which they may be permissibly called upon to exert it is important that the counting-down device, while under the positive control of the meter, shall nevertheless require the exertion of the minimum of power by the latter. Accordingly my invention utilizes the power stored in the spring of the indicator during the counting-up movement to perform the counting-down movement. To this end the counting-down device normally acts merely to restrain the indicator from turning backward under the impulse of its spring and releases it at intervals, permitting it to thus turn backward one step or prescribed space. The counting-down device is in the nature of an escapement, the "anchor" or vibrating stop of which is connected to the totalizing mechanism of the meter, and the escape-wheel is geared (through multiplying-gearing when desirable) to the internal gear, which coacts with the planet-wheel. The escape-wheel is held normally stationary by the stop and holds stationary the internal gear. When the stop is moved by the totalizer, it releases the escape-wheel, which turns through one revolution (more or less) and permits the internal gear to turn through a corresponding fraction of a revolution, and this in turn moves the planet-wheel around the now stationary pinion, displacing its center through a prescribed arc, preferably of equal length to that described by it during one counting-up operation.

It is desirable that the resistance to the release of the escapement shall be not only low, but practically uniform, in order that whatever be the position of the indicator the totalizer shall have the same work to do in starting the counting-down movement. To this end the indicator-spring is made very long in proportion to the limited movement of the indicator and is initially under considerable stress, so that the first counting-up movement (from "0" to "1") is made against practically the full pressure of the spring, and this pressure does not materially or perceptibly increase during the successive movements. Hence the stress tending to count down is not perceptibly greater at the maximum than at the minimum indication, so that the pressure at the stop-tooth remains practically constant and the resistance to the releasing movement is practically uniform at all times.

For cutting off the supply of commodity when the customer's credit of preinserted coins is exhausted I provide a cam recess or notch in connection with the indicating-disk, which upon the final movement of this disk to the zero position comes into coincidence with a roller or projection on an arm or other moving part connected to the cut-off device, so that the movement of such projection into said notch serves to cut off the supply. The cut-off device in the case of an electric meter is an electric switch, which by this movement breaks the circuit. Upon the insertion of a coin the first counting-up movement carries the notch beyond the projection, so that the latter is forced out and its movement is communicated to the cut-off device to reëstablish the supply.

When so many coins have been inserted as to displace the indicator to the extreme of its movement, (which in the case of a rotary disk would complete one rotation thereof or less,) a stop device is actuated by the final movement of the indicator to prevent the movement of the operating-handle to the coin-receiving position, so that the coin-receiving slot of the coin-driving part cannot coincide with the coin-entering slot, and hence no more coins can be inserted until by the operation of the meter the counting-down device has displaced the indicator backward at least one space.

My invention provides a peculiar and especially sensitive escapement designed to oppose the minimum resistance to its operation by the totalizing mechanism of the meter.

My invention provides also means for varying the price unit, so that the meter may be adjusted to deliver a greater or less amount of the commodity for each operation of the counting-down device.

Having thus indicated the nature of my invention and the general mode of its operation according to its preferred embodiment, I will now proceed to describe in detail a prepayment electric meter embodying the preferred form of my invention.

Figure 2:
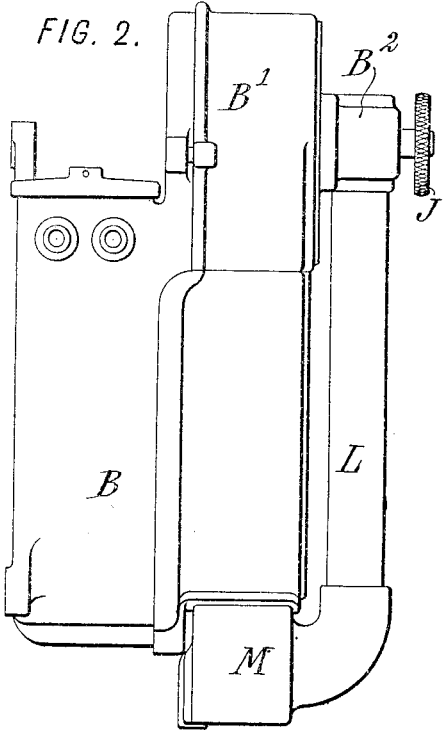
Figure 3:
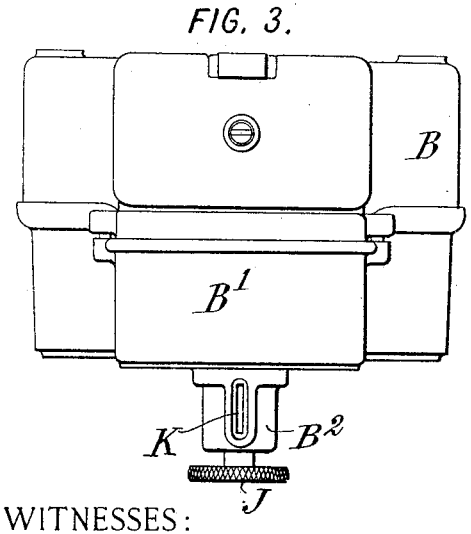
Figure 13:
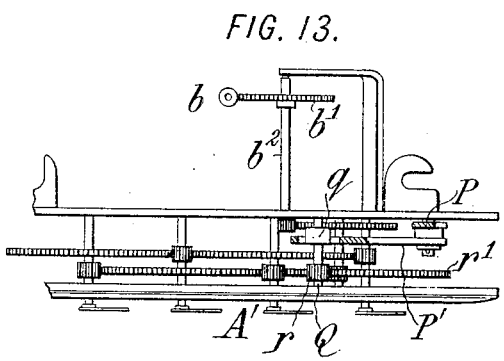

Figure 1 of the accompanying drawings is a front elevation of my improved meter. Fig. 2 is a side elevation thereof. Fig. 3 is a plan thereof, these three views being upon half the linear scale of the succeeding figures. Fig. 4 is a vertical mid-section viewed from the right-hand side. Fig. 5 is a sectional front view, the front of the case being removed and the indicator-disk and its spring-barrel partly broken away to show the parts behind. Fig. 5$^a$ is an enlarged detail of the escapement. Fig. 6 is a horizontal section of the upper part of the mechanism on the lines 6 6 in Figs. 4 and 5. Fig. 7 is a sectional elevation taken generally in the plane of the line 7 7 in Fig. 6 and showing principally the switch. Fig. 8 is a front elevation, partly in section, taken mainly in the plane of the line 8 8 in Fig. 6. Fig. 9 is a fragmentary vertical section in the plane of the line 9 9 in Fig. 6. Fig. 10 is a perspective detail. Fig. 11 is a fragmentary view of certain of the parts shown in Fig. 8 in a different position. Fig. 12 is a section answering to Fig. 9, showing the parts in a different position. Fig. 13 is a plan of the totalizer mechanism and its appurtenances. Fig. 14 is an enlarged fragmentary section showing the frictional connection of the escapement-arms P P'. Fig. 15 shows some of the parts of Fig. 7 in a different position, being partly broken away in section. Figs. 16 to 20, inclusive, show a further development of my invention. Fig. 16 is a sectional front view answering generally to Fig. 5. Fig. 17 is a side elevation of the working parts of Fig. 16, partly in section. Fig. 18 is an enlarged front view, partly in section, showing portions of the mechanism of Fig. 16 in a different position. Fig. 19 is a transverse section through the parts Q Y Z of Fig. 16 on the enlarged scale of Fig. 18. Figs. 20, 21, and $21^a$ are fragmentary front elevations on the same scale as Fig. 18, showing the parts in different positions. Fig. 22 is a front elevation of a modification wherein the prepayment mechanism and electric meter are in separate casings and showing also the electric-circuit connections. Fig. $22^a$ is a sectional plan of the circuit-closer in the meter. Fig. $22^b$ is an enlarged rear view of the circuit-closer cylinder.

I will first proceed to describe that embodiment of my invention which is shown in Figs. 1 to 15, inclusive, where the meter is designed to receive silver ten-cent pieces or dimes and where it is designed to diminish the customer's credit at a fixed rate, which in this instance is ten cents per kilowatt-hour. Obviously to adapt the instrument to coins of other dimensions and to other rates of payment will involve changes merely of proportion.

Let A designate the meter as a whole—that is to say, any ordinary meter—which in this instance is an electric meter and to which my invention is to be applied. The meter is inclosed, as usual, in a casing B of any suitable shape and construction and which in this instance has an upward extension $B'$ for inclosing the prepayment mechanism. I have not attempted to show the mechanism of the meter A, except such part thereof as has some more or less immediate relation to the prepayment mechanism, since the meter may be widely varied in construction without affecting my invention. In Fig. 4 the only parts of the meter shown are the disk armature $a$ and the totalizer $A'$. The armature $a$ is mounted on a spindle $a'$, turning in bearings $a^2$ $a^3$, mounted on a supporting-plate $a^4$, which is fastened within the casing B. The totalizing mechanism $A'$ is driven from the armature-spindle by means of a worm $b$ on the latter and a worm-wheel $b'$, Fig. 7, on a spindle $b^2$, which through any usual train of gearing drives the hands of the totalizer. The particular meter of which these portions form a part is the Wood alternating-current watt-meter, for a particular description of which reference is made to my application, Serial No. 193,210, filed February 11, 1904, (patented January 24, 1905, No. 780,769.)

Within the upper portion or extension $B'$ of the casing is mounted a credit-indicator C, which is preferably a rotative disk or cylinder carrying numbers, which are displayed through an opening $c$ in the front plate of the casing. The indicator C may have any suitable support, that shown consisting of a fixed tube or sleeve $d$, extended at its front end into a flange which is screwed fast to the front plate of the casing. The indicator is provided with means for imparting to it a stress or torque in one direction, which should be substantially uniform in any rotative position of the indicator. The most convenient means for this purpose is an involute spring D of numerous convolutions fixedly attached at its inner end to a pin $d'$ on the sleeve $d$ and connected at its outer end to the indicator-disk, as by hooking it over a lug $d^2$, Fig. 5. To properly inclose the spring, the indicator is made hollow to form a spring-barrel, being provided with a back plate $C'$. The stress of the spring is in such direction as to turn the disk in a backward direction or to the zero position. The spring is wound to nearly its maximum stress in this zero position. A planet-wheel E, Fig. 5, is carried by the indicator, preferably by its pivotal stud $e$, being fixedly attached to the back plate $C'$, as shown in Fig. 4, so that the planet-wheel may turn on this stud. The planet-wheel E meshes with a central pinion F and with a large outer gear G, which latter is preferably an internal gear.

I will now describe the coin-actuated counting-up mechanism which turns the indicator-disk in the forward direction. The central pinion F is a part of this mechanism. Assuming the outer gear G to be held fast, it is obvious that any turning of the central pinion F will cause the planet-wheel E to roll around within the outer gear and will thereby displace its central stud $e$ in the arc of a circle whose center is the common center of the pinion F, the indicator C, and the outer gear G. The pinion F is formed on the end of a shaft H, which turns within the tubular sleeve $d$. This shaft H forms the coin-driven part of the coin-actuated mechanism. For this purpose it may be variously constructed; but, as shown, its front part is slotted through at $H'$, as shown in Figs. 8 and 9, and this slotted portion enters freely within a tubular or barrel shaped coin-driving part I. (Shown separately in Fig. 10.) This part I is mounted rotatively in the casing on an axis coincident with that of the shaft H and having a neck or journal $I'$, which projects out through a bearing-hole in the front of the casing and has fixed upon its outer end an operating-handle J of any suitable shape, which, as shown, is a disk or knob, but it might be variously otherwise shaped. The barrel portion I is slotted through on one side and partly through on the other, Fig. 10, the slot being vertical in the normal position, as shown in Figs. 4 and 9. The portion of the casing in which the barrel-shaped coin-driving part I is mounted to turn is of correspondingly cylindrical shape and constitutes a projection $B^2$ upon the front of the casing. On the top of this projection is a coin-admission slot K, Fig. 3, which, as shown in Fig. 9, is vertical and stands in line with the slots in the parts I and H when the latter are in the coin-receiving position. If when in this position a prescribed coin is dropped in at the slot K, it falls through until arrested by the bottom of the slot in the barrel I, and then stands in the position shown by the circle $x$ in Fig. 4, with its upper and lower edges engaging the slot in I and its middle portion engaging the slot H'. As the operator now turns the handle J to the right the coin will serve as a key for locking together the coin-driving and coin-driven parts, so that rotation is imparted to the shaft H and pinion F during a half-revolution or until the coin-slot in the barrel I has become completely inverted and now coincides with the coin-discharging slot K' in the lower side of the portion B² of the casing, so that upon ceasing the turning effort the coin is released and drops out through the slot K' into any suitable discharge-conduit L. Thus the pinion F is turned a half-revolution and through the planet-wheel E turns the credit-indicator C forward one space or the distance from one figure thereon to the next. In the instance shown the indicator is marked with numbers from "0" and "1" up to "20," being divided into twenty-one spaces, and the gearing is so proportioned that a half-turn of the pinion F turns the indicator one twenty-first part of a revolution. To insure that the coin-actuated device shall drive the pinion F always in the proper direction to advance the indicator and to prevent the pinion from turning backward under the stress of the spring when released from the coin, some means for preventing backward rotation of the shaft H is necessary. The simplest means for this purpose is a ratchet device, the ratchet-teeth $f$ being formed on the shaft H, as shown in Figs. 4 and 8, and engaged by a pawl $f'$, pivoted to some fixed part conveniently to the flange of the sleeve $d$.

It is necessary to limit the movement of the coin-driving part in order to prevent one coin being used to carry the indicator forward more than one space. To this end the coin-driving part or barrel I is provided with stops which limit its movement to a half-revolution, so that upon reaching the coin-discharging position it cannot be turned farther in the same direction, nor can it be turned backward to its original position until the coin is dropped out, and after discharging the coin and on turning it backward to the coin-receiving position it is stopped with its slot in exact coincidence with the coin entering slot K. A convenient construction of stops for this purpose is that best shown in Figs. 8 and 10, where the barrel-shaped part I is at its rear end cut away for a part of its circumference, leaving a projecting portion I², the opposite sides of which form shoulders $g$ and $g'$, which as the barrel is turned are caused to abut against any suitably-located stops. Preferably these stops are provided by the opposite sides of a dog $h$, which has a slight turning or rocking movement, being fixed on a spindle $i$, mounted in suitbearings and having fixed on its rear end an arm $h'$. A spring $i'$ is provided, tending to press the dog $h$ and its arm $h'$ to their normal position, which is that shown in Fig. 8. In this position the shoulder $g$ can enter an angular notch in the dog and is stopped by striking the bottom of this notch, as shown in Fig. 8, in which position the coin-slot in the barrel I coincides with the coin-entering slot, as shown in Fig. 9. On turning the barrel forward a half-turn the shoulder $g'$ strikes against the upper side of the dog $h$ and is stopped thereby with the coin-slot in coincidence with the coin-discharging slot K'. For the performance of these functions the stop formed by the dog $h$ might be immovable. The purpose of making the dog movable is that it may serve also as a movable stop to prevent the insertion of more coins than the prepayment mechanism is designed to receive at any one time.

The credit-indicator C (in the particular construction shown) is adapted to count up not exceeding twenty coins at one time, and if an effort is made to introduce more coins it is necessary that such introduction should be blocked. For this purpose means are provided for rocking the dog $h$ when the credit-indicator C has been moved to its extreme position, so that on attempting to turn back the barrel I to its coin-receiving position its shoulder $g$ strikes the toe of the dog and is stopped in the position shown in Fig. 11, so that, as shown in Fig. 12, the coin-slot in the barrel does not reach coincidence with the coin-entering slot, and an additional coin cannot be inserted. This rocking of the dog $h$ is very simply accomplished by providing on the front of the credit-indicator a pin $j$, which in the zero position stands where indicated in Fig. 8, and which as the indicator is advanced to count up the coins moves in clockwise direction until when the indicator shows "19" it stands in the position $j'$, Fig. 8, just above the arm $h'$, and on the next movement of the indicator to display "20" it moves to the position $j^2$, and in doing so strikes the arm $h'$ and moves it down to the position shown in Fig. 11, thereby tilting the dog $h$. At the next backward movement of the indicator the pin retreats to $j'$ and the spring $i'$ restores the dog to its normal position against a stop-pin $h^2$. It is within this feature of my invention to apply any movable part for closing the coin-entering slot upon the movement of the indicator to its extreme position.

I will now describe the counting-down mechanism for moving the credit-indicator backward at a rate proportional to the consumption of the commodity, as shown by the totalizer-dials of the meter. The work imposed upon the delicate totalizing mechanism is reduced to the minimum by imparting to the credit-indicator, as described, a constant torque or stress tending to move it in the counting-down direction, so that the work imposed upon the totalizer is limited to the mere control of these counting-down movements. The pinion F being normally stationary, the stress of the spring D is exerted through the indicator shell or barrel upon the center of the planet-wheel E and thence upon the large internal gear G, tending to turn this gear in the direction of the outer arrow in Fig. 5. This gear is connected in any suitable way with the escape-wheel O of an escapement, of which the anchor or stop P is operated by the totalizer. In the construction shown the wheel G is provided with external teeth $k$, meshing with a pinion $k'$, fixed to a gear $k^2$, which in turn meshes with a pinion $l$ on the spindle $l'$ of the escape-wheel O; but any other intermediary gearing may be employed. The proportions are such, preferably, that to each release of the escapement the indicator shall turn backward one step or the space from one number to the next—that is, with the proportions shown, one twenty-first of a revolution—in order that the indicator shall always display some one of its numbers centrally at the opening $c$ to clearly indicate the number of coins remaining to the credit of the customer. Preferably the escapement-wheel O turns at each release one complete revolution, having one escape pin or tooth $m$, and accordingly the gearing is proportioned in the ratio of twenty-one to one. The form of escapement shown comprises the escape-wheel O with its one escape-pin $m$ and the vibrating stop P with two pallets $p$ $p'$, so that in the position shown in Fig. 5 the escape-tooth is held by the pallet $p$; but on rocking the stop to the right to release the tooth from this pallet the other pallet $p'$ is moved into the path of the tooth, so that as the escape-wheel makes one turn the tooth is arrested by the pallet $p'$, which holds it until the pallet is vibrated back again to the position shown, whereupon the wheel makes a slight advance, its tooth being again restrained by the pallet $p$. This is in general a well-known form of escapement and may be substituted by any other or equivalent construction of escapement adapted to perform the same function.

The sole work imposed upon the totalizer is to vibrate the escapement-stop P. For this purpose the totalizer-train has added to it a spindle Q, which is geared in any suitable ratio to any one of the gears of the train in order that it shall execute one revolution for each price unit or fraction thereof—that is to say, for example, if each inserted coin pays for one kilowatt hour then the spindle Q must make one revolution (or a determined fraction thereof) to such advance of the totalizer-train as indicates one kilowatt hour. Most conveniently the spindle Q is provided with a pinion $r$, meshing with the gear $r'$ of the kilowatt-hour hand (or unit-hand) of the totalizer, the gears being in the proportion of ten to one. The spindle Q is provided with any suitable means for operating the stop P. Most simply it may carry, as shown, an eccentric $q$, engaging in a slot or forked end of an arm P', connected to the stop-arm P, so that to each complete turn of the spindle Q the stop P is given one complete vibration. To facilitate the adjustment of the stop P and arm P' to the correct angular relation to cause the pallets to accurately engage the escape-tooth, they are united by a frictional connection, as shown in Fig. 14, the hub of one arm fitting somewhat tightly over the hub of the other. Thus, as shown, the arm P' has a tubular hub $s'$, which fits frictionally within a tubular hub $s$ on the stop-arm P. The engagement of these hubs is so tight as to compel the two arms to move together as a single elbow-lever during the operation of the mechanism, while permitting one to be forcibly turned on the other during the original assembling or adjustment.

Fig. 5$^a$ shows in detail one feature of the escapement which differs from the ordinary form of dead-beat escapement used in clocks or the like. The under or working faces of the pallets $p$ $p'$ are inclined or beveled in such direction as to cause the pressure of the tooth $m$ against them to tend to move the stop-arm in the direction necessary to release this pin or tooth. By this means the pressure of the spring D against the escape-tooth $m$ facilitates the movement of the stop-arm, so as to assist the totalizing mechanism in its work of moving this arm to release the escape-wheel. It also has the effect of diminishing the friction of the pallets against the escape-tooth. The angle of these working faces may be varied as desired, it being obvious that this angle may be made just sufficient to balance the pressure and eliminate friction, or adopting a greater angle the stress of the spring may be communicated through the escape-pin to the pallets, so as to tend to urge forward the totalizing mechanism or by adopting a lesser angle any desired degree of friction may be generated, which must be overcome by the power of the motor element of the meter exerted through the totalizing mechanism.

The means for cutting off the supply of the commodity upon the credit of the customer being exhausted—that is to say, upon the indicator making its final movement to the zero position—may be variously applied. In an electric meter the supply is cut off by an electric switch, which is opened to break the circuit. This switch is preferably operated by means of a cam-surface on or carried by the credit-indicator. The preferred construction is that clearly shown in Figs. 5, 6, and 7, where a movable part connected with the switch is pressed against the periphery of the indicator disk or barrel and at the zero position of the latter comes into contact with a cam by which it is displaced to move the switch to break the circuit. In the construction shown the outer flange or barrel portion of the indicator has a cam-notch $C^2$, into which at the zero position enters the end of an arm R, having, preferably, an antifriction-roller on its end. This arm is a projection from a rock-shaft R′, from which projects another arm $R^2$, the end of which is connected, through a rod $R^3$, with the movable member of the switch and with a spring S, the stress of which is exerted to press the end of the arm R toward the indicator-barrel. On the insertion of the first coin and the movement of the indicator from "0" to "1" the end of the arm R is lifted out of the notch $C^2$, and the arm $R^2$ and rod $R^3$ are thrown upward to close the switch, this being the position shown in Fig. 7. During the succeeding counting-up movements of the indicator the roller on the end of the arm R rolls against the periphery of the indicator-drum, as shown in Fig. 16. Upon the final counting-down movement from "1" to "0" the arm R again drops into the notch $C^2$ and opens the switch.

The switch, which is best shown in Fig. 7, may be variously constructed. As shown, the rod $R^3$ passes freely through a guiding-post S′, against which the spring S reacts, and carries a yielding washer $S^2$, which cushions its downward movement. On the rod $R^3$ is loosely carried a cross-bar T, of insulating material, preferably stiffened by metal plates $t\ t$, riveted through on opposite sides. Near the opposite ends of the bar T are connected contact-brushes U U, composed of laminæ upturned at both ends to make edge contacts with flat under faces of binding-posts or contact-terminals V V, to which posts the respective wires W of the electric circuit or circuits are connected. Each of the laminated contacts or brushes U is fastened at its middle to a yoke or stirrup-piece U′, which is pivoted at $t'$ to the insulating-bar T. The bar T being loosely mounted on the rod $R^3$ is able to rock thereupon and is pressed upwardly at its middle by a short spring T′, the tension of which is adjusted by a nut $T^2$ screwing on the rod $R^3$. The upward movement of the rod is sufficient to seat the contact-brushes and put the spring T′ under sufficient stress to exert an upward pressure against the contact-faces strong enough to insure perfect electrical contact. By reason of the rocking of the bar T the pressure of the spring T′ is equally divided between the yokes U′ U′, and by the rocking of these yokes on their pivots $t'$ the pressure is equally divided between the opposite ends of the respective brushes U, so that at the four contact-surfaces an equal and uniform contact is maintained. The switch is shown closed in Fig. 7 and open in Fig. 15. Necessarily the spring T′ is stiffer than the spring S. This construction of switch is especially adapted to a prepayment electric meter of the construction provided by my invention.

The inserted coin after it has done its work of operating the counting-up mechanism may be dropped into any receptacle from which the coins may be removed at intervals. In the construction shown a conduit L is arranged outside of the meter proper, its upper end registering with the coin-discharging slot K′ and its lower end communicating through a curved branch conduit L′ with the coin box or receptacle M. In falling the coin acquires considerable velocity, and on striking the curved side of L′ it is thrown backwardly into the box M, so that it is given a tendency to reach the rear portion of this box instead of remaining in or near the conduit L′ so as to clog the latter. The box or receptacle M is removably attached to the meter-casing, being locked thereto in any suitable manner. As shown, the casing is provided with a fixed pendent rod M′, the lower end of which is engaged by a lock N of any suitable construction, by unlocking which the box M may be displaced downwardly to take out the coins. The lock shown has a barrel 30 with a projection 35, and the rod M′ is held in a socket 36. Preferably the conduit L is fixed at its lower end to the box M, its upper end being inserted loosely into a socket beneath the slot K′, as shown, so that the conduit comes off with the box. The coin-conduit L is made as flat or narrow as possible in order that since it crosses the totalizer-dials it may not obstruct the view thereof. By this construction and arrangement of the coin-discharge conduit it serves a beneficent purpose in requiring a person reading the meter to look at it from directly in front, from which position only can the meter indication be read correctly.

I will now proceed to describe certain additional features of my invention, whereby the meter instead of being adapted only for a fixed rate of payment is adapted for adjustment as well to various rates, so that the distributer of a given commodity may use the same meters for all customers, adjusting them to operate the counting-down mechanism at rates proportional to the varying prices charged to different customers for the commodity. For example, if an electric company is supplying lights at ten cents per kilowatt-hour to customers using light only at the busy hours or peak of the load curve it may be desirable to charge at a lower rate— say five cents, four cents, &c.—to customers using current during the entire day, so as to encourage increase of use during the hours when there is the minimum load on the station. To enable such changes of rate to be made quickly and without the alteration of any of the mechanical parts of the mechanism, I have devised the variable-rate counting-down mechanism shown assembled in Fig. 16, which is a view answering generally to Fig. 5. Fig. 16 also shows a different form of escapement, but for clearness of description I will first assume that the escapement shown in Fig. 5 is unchanged, except that the arm P' for operating the stop instead of being a slotted arm to be operated by an eccentric is a straight arm, which in Fig. 16 is lettered $P^2$, to be operated by tappets. These tappets are carried by a part which I will call a "traveler," which part is displaced little by little by the totalizer to a greater or less distance, according to its adjustment, and is then caused to return to its starting-point, the escapement being operated at the extreme upper and lower limits of its movement. This traveler is preferably a drop, lifted intermittently and finally tripped and permitted to fall back; but instead of falling by gravity it may be caused to move in some other direction under the influence of a spring or other means to like effect. As shown, however, the traveler consists of a sector Y having an arm Y', by which it is connected to a pivot $u$, around which the sector swings, gravity being preferably utilized to give it its return movement, which in this case is a downward movement. The sector carries two pins or tappets $v$ and $w$, which are relatively adjustable to vary the distance between them. Preferably only one pin is adjustable, and preferably this is the upper pin $w$. As one means of adjustment the sector has a series of holes $u'$, in one or another of which the pin $w$ may be placed. Preferably the holes are screw-threaded, and the pin $w$ is made as a screw to screw tightly into any one of the holes. The tappet-pins $v$ $w$ are designed to act upon the end of the arm $P^2$, the lower pin to lift this arm and the upper pin to press it down. The arm is capable of vibrating between fixed stops $x'$ $x^2$, Fig. 18, being normally in contact with the lower stop. To hold the arm securely in either its upper or lower position and prevent accidental displacement, its end is beveled and engaged by a double-inclined leaf-spring $y$. Any suitable means may be provided whereby the totalizer shall lift or displace the traveler at a rate proportional to the advance of the meter. I prefer for this purpose to apply a lifting device acting intermittently. To this end I provide the sector Y with suitable teeth $y'$, and provide a lifter Z for engaging these teeth successively and intermittently, lifting the sector. The lifter Z is driven in any suitable way from the totalizer-train. For example, I may employ the same spindle Q as in Figs. 5 and 13, geared to the totalizer-train in the same or any different ratio, and instead of applying the eccentric $q$ thereon I may fix on such spindle a gear-wheel $q'$, Fig. 19, meshing with a pinion on a spindle Z', which carries the lifter Z, the latter consisting, essentially, of a crank-pin $z$, which as it revolves takes under the teeth $y'$ successively, thereby lifting the sector intermittently. As the pin clears itself from the tooth after lifting it the sector would fall but for the provision of a stop-pawl $Y^3$, pivoted to the arm $P^2$ and having its nose pressed toward the tooth by a spring $y^2$. The lifter is proportioned to lift the sector somewhat more than the length of a tooth at each movement to insure the entering of the pawl $Y^3$, so that when the lifter frees the sector it drops back a fraction of a space until arrested by the pawl. Preferably the teeth $y'$ are spaced the same distance apart as the holes $w'$; but this is not essential. Preferably, also, the lifting-spindle Z' carries a counterweight $Z^2$ to partially counterbalance the weight of the sector Y. The operation of this variable-rate escapement-operating mechanism may now be understood. As the meter operates, the lifter Z is revolved at a rate proportional to the advance of the totalizer, and at each revolution its pin lifts the sector Y the space of one tooth, the pawl $Y^3$ each time arresting it. This operation continues, the sector being gradually carried higher until finally when the lifter engages the lowermost tooth the pin $v$, which now is directly beneath the arm $P^2$, lifts this arm as the sector is lifted and in so doing raises the pivot of the pawl $Y^3$ and by carrying the tail of the pawl against the stop-pin $x^2$ swings the pawl out of engagement with the teeth, as shown in Fig. 20. The lowermost tooth is made slightly longer than the others, so that when the lifter-pin $z$ clears it the sector can fall freely without the other teeth touching the lifter-pin. In this falling movement the arm $P^2$ remains up, held by the spring $y$, as shown in Fig. 20. The sector now falls until its adjustable tappet-pin $w$ strikes the arm $P^2$ and throws it down to its original position, as shown in Fig. 16, thereby releasing the pawl $Y^3$, which enters again into engagement with one of the teeth. Thus an up-and-down vibration is imparted to the arm $P^2$, which in turn imparts it to the stop P, which, as stated, may be constructed and operated as in Fig. 5. With the continued movement of the totalizer the lifter Z again intermittently lifts the sector, and these operations are repeated. Accordingly the sector falls more or less frequently, depending upon the adjustment of the tappet-pin $w$. If this pin is set in one of the lower holes, the sector falls more frequently and the escapement is operated oftener, thereby counting down the credit-indicator at a more rapid rate, and vice versa. It is easy by preparing a suitable table to determine in which of the holes $u'$ the pin $w$ should be inserted in order to adapt the meter to any of a graduated series of rates of payment.

When such variable-rate mechanism is used, there is necessarily imposed upon the totalizing mechanism a greater work to be done than in the case of a simple escapement, such as is shown in Fig. 5. It is hence desirable to diminish the work or load imposed upon the totalizer by the operation of the escapement itself and also to reduce the blow of the escape-tooth on the pallets. To this end I have devised a special and more delicate form of escapement than the two-motion escapement hereinbefore described. This special escapement, which I call a "three-motion escapement," has the effect of diminishing the frictional retardation due to the stress of the spring D in its effect upon the escapement-pallet, and thereby diminishing the effort required in final movement to not only lift the sector Y, but to displace the escapement-arm $P^2$. To this end I provide for gearing up from the indicator to an escapement-wheel, through a train of any suitable length and in any suitable ratio, so as to diminish the pressure of the spring on the escape-pin to any desired fraction, and I construct the escapement when moved to release the escape-wheel to leave it free to make not merely one revolution, but as many revolutions as may be necessary to displace the indicator one space or to other desired extent, and I provide means adapted to come into operation at the end of such predetermined number of revolutions for stopping the escape-wheel, after which the escapement is restored to its original condition, ready for a new operation. The preferred mechanism for carrying out this feature of my invention is shown in Figs. 16, 17, and 18. The outer teeth $k$ of the indicator gear-wheel G are made to drive a pinion $l$ either through such a train as is shown in Fig. 5 or by direct engagement therewith, as shown in Figs. 16 and 18. The pinion $l$ carries on its spindle $l'$ a wheel $O'$, which resembles the escape-wheel O in having a single tooth or pin $e'$, but differs therefrom in that this pin is not an escape-pin, but has the function of a cam to act upon an escapement-arm $P^4$. The wheel $O'$, which I call a "cam-wheel," is geared to a pinion $o'$ on the spindle of an escape-wheel $O^2$, carrying an escape tooth or pin $m'$. The escape-tooth $m'$ is normally held by the hooked end or pallet $p^3$ on the end of a stop-arm $P^3$, which (like the stop-arm P in Fig. 5) is by preference frictionally connected to the hub of the arm $P^2$, (in the manner shown in Fig. 14.) Another arm $P^4$ is freely hung on the same pivotal stud $z'$ and has at its upper end a stop-pallet $p^4$, while at a convenient point it is provided with a curved nose or cam projection $p^2$, which normally stands in the path of the cam-pin $e'$. With the proportions shown the cam-wheel $O'$ is designed to make one revolution to each counting-down movement, being geared to the indicator in the ratio of twenty-one to one, and the escape-wheel $O^2$ is geared to the cam-wheel in the proportion of fifteen to one, so that its ratio to the indicator is three hundred and fifteen to one. Any other proportions are, however, admissible. In operation when the pin $v$ lifts the arm $P^2$ this carries the arm $P^3$ with it and withdraws the pallet $p^3$ from above the tooth $m'$, so that the latter escapes, as seen in Fig. 21. The escape-wheel then makes fifteen turns before it is stopped. While it is making the fifteenth turn the pin $e'$ on the cam-wheel strikes the projection $p^2$, as shown in Fig. 21, and presses back the arm $P^4$, as shown in Fig. 21ª, so that the stop-pallet $p^4$ is moved into the path of the tooth $m'$, so that at the end of its fifteenth turn it strikes this pallet and is stopped in the position shown in Fig. 21ª. These operations occur during the time that the lifting movement of the sector is being completed by the engagement of the pin $z$ with the last tooth, Fig. 20, and while the sector is falling. At the end of its fall and when the tooth $w$ strikes the arm $P^2$ and throws it down this vibrates the arm $P^3$ again toward the left, so that its end strikes the pallet $p^4$ and drives it out of the path of the escape-tooth, thereby restoring the escapement to the position shown in Fig. 18, ready for the next operation. In so doing the escape-tooth moves upward slightly into engagement with the pallet $p^3$. A light spring $p^5$ is provided, engaging the arm $P^4$ in order to hold it against accidental displacement. Preferably the spring is bent to form two shallow notches engaged by a small pin $p^6$ on the arm. The spring is fastened to a pin projecting rearwardly from the front plate of the support. The under or working faces of the pallets $p^3 p^4$ are preferably inclined for the same purpose as described with reference to Fig. 5ª.

It is preferable with the three-motion escapement just described to provide means for retarding the speed of the escape-wheel in order that when its tooth $m'$ is stopped by the pallet $p^4$ the jar thereby occasioned shall be reduced to a minimum. For this purpose I prefer to construct the escape-wheel $O^2$ with external gear-teeth driving a pinion $o^2$, on the spindle of which is mounted a fly $O^3$. This fly keeps the escape-wheel from revolving faster than a determined speed and prevents its teeth striking the pallet such a blow as will objectionably jar the mechanism.

It is desirable to retard the return movement of the traveler or sector Y in order that when falling only a short distance it shall not return too quickly to give ample time for the escape-wheel to execute the predetermined number of turns and when falling a longer distance it shall not strike so hard a blow as to cause it to rebound. For these purposes I apply a retarder to it, preferably in the form of a dash-pot $Y^2$, as shown in Fig. 16. This form of retarder is more effective the longer is the fall of the traveler, so that its pin $w$ always strikes the arm $P^2$ with the same force for any length of fall.

It is sometimes desirable to separate the prepayment mechanism from the electric meter proper in order that the latter may be placed, for example, in a cellar or other place which may be desirable, but where it is not sufficiently accessible to the householder for the purpose of introducing coins. In such case the counting-down mechanism may be operated by an electromagnet or other device controlled by a circuit connection leading to the meter. One suitable arrangement is that shown in Fig. 22. The prepayment mechanism is here inclosed in a case $B^3$ by itself, while the electric meter proper is inclosed in a case $B^4$. Of the meter mechanism the only portion shown is the totalizer $A'$. The prepayment mechanism inclosed in the case $B^3$ may be of precisely the same construction already described, except that it is severed from direct engagement with the meter, and its escapement is operated by an electromagnet $Q^2$, (which acts as a substitute for the eccentric $q$ of Fig. 5.) This magnet is included in a separate circuit connection or shunt $x'$ $x'$, leading from a terminal on one side of the switch to a circuit-closer operated by the totalizer $A'$. This circuit-closer may be of any suitable kind—as, for example, that shown, where two contact-springs 27 27 (shown in plan in Fig. $22^a$) are electrically connected at intervals by a metallic strip 28, carried on, but insulated from, the totalizer-spindle Q, (which latter may be arranged and driven in the manner described with reference to Fig. 5,) so that at each revolution of this spindle the metallic strip touches the two contact-springs, and thereby closes the shunt $x'$, so that a current passes which energizes the magnet $Q^2$. The magnet consequently attracts its armature $Q^3$, which is connected to the escapement-arm P, (which may be constructed exactly like the escapement-arm P of Fig. 5,) to release the escape-wheel and permit it to make one turn, thereby counting down the credit-indicator one unit. On the breaking of the shunt-circuit the magnet is demagnetized and the armature moves away from it, preferably by gravity, thereby restoring the escapement ready for the next operation.

It is desirable, to prevent sparking at the instant of breaking the shunt, to use a quick-action or jump circuit-breaker of any known kind. One suitable construction for this purpose is shown. The connecting metal strip 28 is carried by a loose cylinder or barrel 280, of insulating material, which is mounted loosely on the spindle Q, so as to be able to make about a quarter-turn thereon between stops. A simple construction of such stops is that shown in Fig. $22^b$, where the spindle has a cross-pin 281 projecting into and engaging angular recesses in the end of the cylinder. A light spring 29, coiled around the spindle, has one end connected to the loose cylinder and the other to the spindle or its pinion $r$. This spring presses the cylinder forward as far as the loose connection will permit. When the projecting part of the cylinder touches the springs 27, it encounters sufficient resistance to stop the rotation of the cylinder, while the spindle Q continues to advance until its pin 281 takes up the lost motion, after which it presses the cylinder positively forward to carry the metal strip under the springs to close the circuit. As the strip passes the springs 27, so that the cylinder becomes free therefrom, the spring 29 throws it suddenly forward, thereby breaking the circuit quickly and preventing injurious sparking. The springs 27 are mounted on a suitable insulating-piece. The construction of this circuit closing and breaking device may be widely varied.

Preferably the magnet $Q^2$ and its armature $Q^3$ are both laminated, so that the device may be used on either alternating or direct currents.

The operation of my prepayment-meter is, briefly stated, as follows: Starting with the zero position, where the switch is open, Figs. 5, 8, and 15, the insertion of the first coin, followed by a half-turn of the handle J to the right, displaces the credit-indicator one space, thereby closing the switch, Fig. 7, and displaying the figure "1." Thereafter as many more coins may be successively introduced as are within the capacity of the instrument. As each coin is inserted the coin-driving part or barrel I must be turned with its coin-receiving slot uppermost, Fig. 9, whereupon the coin falls to the position $x$ in Fig. 4, and on giving this barrel a half-turn to the right the coin transmits motion through the coin-driven part or spindle H to the pinion F, which turns the planet-wheel E, which, rolling against the stationary internal gear G, imparts movement to the indicator C. The coin is dropped out through the discharging-slot $K'$ and falls through conduit L into the box M, the handle J being turned back a half-turn to the coin-receiving position before the next coin is admitted. Thus the pinion F turns forward a half-turn for each coin inserted, and each time the indicator C turns forward one space, thereby counting up the coins and indicating the number of coins inserted. When the full number (twenty in this instance) has been inserted, the stop $h$ is displaced, Fig. 11, so that the barrel I cannot be turned back farther than is shown in Fig. 11 and no more coins can be inserted. As the current is consumed the operation of the meter counts up on the totalizing mechanism in the well-known manner, and at predetermined intervals this mechanism rocks the escapement-arm P, so that its pallets release the escape-wheel O, Fig. 5, and permit the latter to make one revolution under the impulse of the spring D, whereby the gear-wheel G turns in the direction of the arrow in Fig. 5 far enough to permit the indicator C to turn back one space, thereby counting down one number and showing that current corresponding in value to one coin has been consumed. In case the variable-rate mechanism shown in Figs. 16 to 21 is used the operation of the totalizing mechanism acts to repeatedly lift the traveler or sector Y until its pin $v$ rocks the lever $P^2$ and releases the escapement, which permits the gear-wheel G to turn to the stated extent and equally causes a single counting-down movement of the indicator, this movement being stopped by the arrest of the escape-tooth $m'$ by the pallet $p^4$, Fig. 21$^a$, and upon the pin $w$ on the sector Y striking the lever $P^2$ the parts are restored for the next operation. When the indicator executes its last counting-down movement from "1" to "0," the lever-arm R drops into the cam-notch $c^2$ and the switch is thrown open by its spring S, thereby breaking the circuit and shutting off the customer's lights until he again feeds one or more coins into the meter.

It must not be inferred from the particularity with which I have described the preferred details of construction that my invention is limited to the use of these details. My invention may be variously applied by resorting to a wide range of equivalents for the specific devices or elements described. The construction and proportions may be variously modified in order to adapt my invention to the varied requirements of practice. For example, it is to be understood that the part which I have called an "indicator" or "credit-indicator" need not necessarily display any indication whatever, since its mechanical functions would be precisely the same if it carried no figures on its face or if the window $c$ were omitted or closed over. This so-called "indicator" need not move in a circular path, although this is most convenient.

The special features of the switch herein shown are not claimed in my present application, but are claimed in my divisional application, Serial No. 257,838, filed April 28, 1905. I do not in this application claim those features of the coin-box, conduit, lock, &c., herein set forth, which are applicable to receiving the coin from any other coin-actuated apparatus, such features being disclosed in a separate application, partly divided out from the present one, filed September 21, 1905, Serial No. 279,466.

I claim as my invention—

1. The combination with a meter, of a credit-indicator movable forward or backward, the position of which corresponds to the unexpended credit of inserted coins, means tending to move it in a backward direction, a coin-actuated mechanism adapted for moving it forward by definite steps against the stress thereof to credit the coins inserted, and means controlled by the meter for releasing it and permitting it to move backward to debit the value of the commodity measured.

2. The combination with a meter of a rotary credit-indicator, means tending to move it in a backward direction, a coin-actuated counting-up device comprising a planet-gear, for moving it in a forward direction, to credit the coins inserted, and means controlled by the meter for releasing it and permitting it to move backward to debit the value of the commodity measured.

3. The combination with a meter of a credit-indicator, means tending to move it in a backward direction, a coin-actuated mechanism for moving it forward to credit the coins inserted, and an escapement controlled by the meter for releasing it at definite intervals and permitting it to move backward to debit the value of the commodity measured.

4. The combination with a meter of a rotary credit-indicator, means tending to move it in a backward direction, and a counting-up mechanism for advancing the indicator to credit an inserted coin, comprising a planet-wheel carried by said indicator, a normally stationary internal gear meshing with said wheel, a central pinion meshing with said wheel, and a coin-actuated device for turning said pinion.

5. The combination with a meter of a rotary credit-indicator, and a counting-up mechanism for advancing the indicator to credit an inserted coin, comprising a planet-wheel, a pinion meshing therewith, a coin-actuated device for turning the pinion forward, and means for preventing the backward turning of the pinion.

6. The combination with a meter of a rotary credit-indicator, means tending to move it backward and a counting-up mechanism for advancing the indicator against the stress of said means to credit an inserted coin, comprising a coin-driven rotary part, means for preventing its turning backward, a reciprocating coin-driving part having an operating-handle, and stops for limiting the movements thereof, said part adapted upon its forward movement when a coin is interposed, to turn said coin-driven part, and to move backward only when the coin is absent.

7. The combination of a casing having a coin-entering slot, a movable coin-driving part having an operating-handle and a slot which in one position registers with said coin-entering slot, a coin-driven part adapted to be locked to said driving part by an inserted coin, an indicator movable by said coin-driven part, and a movable stop displaced by said indicator in its final movement, and when displaced entering the path of said coin-driving part to prevent its movement to bring its slot into coincidence with the coin-entering slot.

8. The combination with a meter, of a credit-indicator, a coin-actuated mechanism for displacing it to credit the coins inserted, a casing having a coin-entering slot, a movable coin-receiving part having a slot which in one position registers with said coin-entering slot, and a movable stop displaced by said indicator in its final movement and adapted to prevent the movement of said coin-receiving part with its slot in coincidence with said coin-entering slot, whereby to prevent the insertion of another coin.

9. The combination of a casing having a coin-entering slot, a barrel having an operating-handle and a slot which in one position registers with said coin-entering slot, an indicator, means for displacing it by the action of an admitted coin, and a movable stop adapted to be displaced by said indicator in its final movement and when so displaced to engage a shoulder on said barrel and prevent the movement of the latter to bring its slot into coincidence with the coin-entering slot, whereby to prevent the insertion of another coin.

10. The combination with a meter of a credit-indicator means imparting to it a constant tendency to move in a backward direction, means adapted for displacing it in a forward direction, and means for controlling its movement in the backward direction comprising a gear connected to said indicator, an escape-wheel connected to said gear to be turned thereby, and an escapement-stop engaging said escape-wheel and connected to the totalizing mechanism of the meter to be vibrated thereby.

11. The combination with a meter of a rotary credit-indicator means imparting to it a constant tendency to move in one direction, a central pinion, a planet-wheel carried by said indicator meshing with said pinion, a normally stationary internal gear meshing with said planet-wheel, an escape-wheel geared to said internal gear, and an escapement-stop engaging said escape-wheel and connected to the totalizing mechanism of the meter to be vibrated thereby.

12. The combination with a meter comprising a totalizing mechanism, of an indicator, a coin-actuated mechanism for advancing it, and an escapement for controlling its backward movement, comprising an escape-wheel and a stop-lever having two arms, one carrying a pallet for engagement with the escape-wheel and the other vibrated by the totalizing mechanism, and said arms united by a frictional engagement to facilitate adjustment.

13. The combination with a meter of a credit-indicator movable backward and forward within limits, a means tending to move it in a backward direction and exerting a substantially constant stress, a coin-actuated counting-up mechanism for moving the indicator forward against the stress of said means, and a counting-down mechanism controlled by the meter for releasing the indicator and permitting it to move backward under said stress, whereby said counting-down mechanism operates under a substantially uniform resistance.

14. The combination with a meter of a credit-indicator movable backward and forward within limits, a spring tending to move it in a backward direction and of a length sufficiently in excess of the flexure corresponding to the extreme movement of said indicator to exert a substantially constant stress at all positions thereof, a coin-actuated counting-up mechanism for moving the indicator forward against the stress of said spring, and a counting-down mechanism controlled by the meter for releasing the indicator and permitting it to move backward under said stress, whereby said counting-down mechanism operates under a substantially uniform resistance.

15. The combination with a meter of a rotary credit-indicator having a limited movement, an involute spring of many convolutions applied thereto, under an initial stress at the zero position of said indicator, and of such length as to exert a substantially constant stress during the entire range of movement thereof, a coin-actuated counting-up mechanism adapted to turn said indicator against the stress of said spring, and a counting-down mechanism operated by the meter for releasing said indicator and permitting it to turn backward under the stress of said spring, whereby the counting-down mechanism operates under a substantially uniform resistance.

16. The combination with a meter of an indicator tending to move in one direction, an escapement for controlling such movement, and means for operating the stop-arm of said escapement under control of the totalizing mechanism of the meter, comprising a traveler, operatively engaging said stop-arm, means operated by the totalizing mechanism for displacing said traveler at a rate proportional to the advance of the meter, and a releasing device adapted at the extreme displacement of said traveler to release it and permit it to return to its starting-point.

17. The combination with a meter of an indicator tending to move in one direction, an escapement for controlling such movement, and means for operating the stop-arm of said escapement under control of the totalizing mechanism of the meter, comprising a traveler, a means operated by the totalizing mechanism adapted to displace said traveler at a rate proportional to the advance of the meter, a releasing device adapted at the extreme displacement of said traveler to release it and permit it to return to its starting-point, and a connection between said traveler and stop-arm whereby the latter is given one complete vibration to each complete movement of the traveler, adjustable to vary the extent of such movement.

18. The combination with a meter of an indicator tending to move in one direction, an escapement for controlling such movement, and means for operating the stop-arm of said escapement under control of the totalizing mechanism of the meter, comprising a traveler, a means operated by the totalizing mechanism adapted to displace said traveler at a rate proportional to the advance of the meter, a releasing device adapted at the extreme displacement of said traveler to release it and permit it to return to its starting-point, and two tappets carried by said traveler adapted to operate the escapement stop-arm and said releasing mechanism, one of said tappets being adjustable to vary the movement of said traveler.

19. The combination with a meter of an indicator tending to move in one direction, an escapement for controlling such movement, and means for operating the stop-arm of said escapement under control of the totalizing mechanism of the meter, comprising a traveler, a means operated by the totalizing mechanism adapted to intermittently lift said traveler, a releasing device for permitting said traveler to fall, said traveler carrying tappets adapted to engage and operate said stop-arm and releasing device, and one of said tappets being adjustable toward or from the other to vary the extent of movement of the traveler.

20. The combination with a meter of an indicator tending to move in one direction, an escapement for controlling such movement, and means for operating the stop-arm of said escapement under control of the totalizing mechanism of the meter comprising a traveler having ratchet-teeth, means operated by the totalizing mechanism for intermittently engaging said teeth to displace the traveler, a retaining-pawl engaging said teeth for holding the traveler displaced, and means operative when the traveler has reached its extreme displacement for withdrawing said pawl to permit the traveler to return.

21. The combination with a meter of an indicator tending to move in one direction, an escapement for controlling such movement, and means for operating the stop-arm of said escapement under control of the totalizing mechanism of the meter comprising a traveler having ratchet-teeth, a rotary tappet on a spindle driven by the totalizing mechanism for successively engaging said teeth to intermittently displace the traveler, a retaining-pawl engaging said teeth for holding the traveler displaced, and means operative when the traveler has reached its extreme displacement for withdrawing said pawl to permit the traveler to return.

22. The combination with a meter of an indicator, a coin-actuated mechanism for advancing it in one direction, and means controlled by the meter for determining its movement in the contrary direction, said means comprising a movable part moved by the meter and adjustable to vary the rate of payment.

23. The combination with a meter of an indicator, a coin-actuated mechanism for advancing it in one direction to credit the coins inserted, and means for moving it in the contrary direction controlled by the meter, said means comprising an adjustable part adapted by its adjustment to vary the rate of payment.

24. The combination with a meter, of an indicator, a coin-actuated mechanism for advancing it in one direction, means controlled by the meter for determining its movement in the contrary direction, said means comprising a movable part moved by the meter and adjustable to vary the rate of payment, and a retarding device for regulating the movement of said movable part.

25. The combination with a meter of an indicator tending to move in one direction, an escapement for controlling such movement, and means for operating the stop-arm of said escapement under control of the totalizing mechanism of the meter, a means comprising a traveler formed as a toothed sector, driven by the totalizing mechanism for intermittently engaging its teeth to displace the sector, means engaging said teeth to hold the sector displaced, means for releasing it to permit it to return to its starting-point, and a retarding dash-pot for regulating its return movement.

26. The combination with a meter of an indicator tending to move in one direction, and an escapment for controlling such movement comprising a cam-wheel geared up from the indicator and an escape-wheel geared up from the cam-wheel, an escapement-arm having a releasing-pallet adapted to engage said escape-wheel and moved by the totalizing mechanism of the meter, and an escapement-arm having a stop-pallet displaced by said cam-wheel to stop the escape-wheel.

27. The combination with a meter of an indicator tending to move in one direction, and an escapement for controlling such movement comprising a cam-wheel geared up from the indicator, an escape-wheel geared up from the cam-wheel, and means under control of the totalizing mechanism of the meter adapted to release the escape-wheel and permit it to turn freely during a given movement of the cam-wheel, and thereupon under control of the latter to stop the escape-wheel.

28. The combination with a meter of an indicator, and a three-motion escapement for controlling its movement comprising a cam-wheel geared up from the indicator, an escape-wheel geared up from the cam-wheel, an escapement-arm moved by the totalizing mechanism to release the escape-wheel, a stop-arm moved by the cam-wheel to stop the escape-wheel, and means for restoring said escapement-arm and stop-arm to their original positions.

29. The combination with an electric meter of a rotary indicator having a cam-recess, a coin-actuated mechanism for advancing it from a zero position to credit the coins inserted, a counting-down mechanism controlled by the meter for moving it backward toward said position, a switch movable to close or break the circuit, and a lever-arm engaging said indicator entering its cam-recess in the zero position and connected to said switch to operate the same upon the return of the indicator to its zero position.

30. The combination with an electric meter, of a credit-indicator, a coin-actuated mechanism for advancing it from a zero position to credit the coins inserted, a counting-down mechanism controlled by the meter for moving it backward toward said position, said credit-indicator having a cam-surface, a switch movable to close or break the circuit, and a connection between said switch and cam-surface adapted in the zero position to open the switch, and in other than the zero position to close the switch.

31. The combination with a meter of an indicator, means for imparting to it a constant tendency to move in a backward direction, a coin-actuated mechanism for advancing it in a forward direction against the stress of said means, and an escapement controlled by the meter for determining its movement in the backward direction, said escapement comprising an escape-tooth receiving the stress of said means, and a stop-arm operated by the totalizer of the meter and having a pallet, said pallet and tooth having working faces relatively inclined to facilitate the releasing movement.

32. The combination with a meter and its casing having totalizer-dials, of a coin-actuated mechanism, and a coin-discharge conduit for receiving the coin therefrom, extending outside the casing vertically across the totalizer-dials in a plane perpendicular thereto.

33. The combination with a meter, of a credit-indicator movable forward or backward, the position of which corresponds to the unexpended credit of inserted coins, means tending to move it in a backward direction, multiplying-gearing driven by it during its backward movement, a coin-actuated mechanism adapted for moving it forward by definite steps against the stress of said means to credit the coins inserted, and means controlled by the meter engaging said multiplying-gearing for releasing it and permitting the indicator to move backward to debit the value of the commodity measured.

34. The combination with a meter, of a credit-indicator, means tending to move it in a backward direction, multiplying-gearing driven by it during its backward movement, a coin-actuated mechanism for moving it forward to credit the coins inserted, and an escapement controlled by the meter engaging said multiplying-gearing for releasing it at definite intervals and permitting the indicator to move backward to debit the value of the commodity measured.

35. The combination with an electric meter, of a credit-indicator, a coin-actuated mechanism for advancing it from a zero position to credit the coins inserted, a counting-down mechanism controlled by the meter for moving it backward toward said position comprising multiplying-gearing driven by said indicator during its backward movement, said credit-indicator having a cam-surface, a switch movable to close or break the circuit, and a connection between said switch and cam-surface adapted in the zero position to open the switch, and in other than the zero position to close the switch and hold it closed.

In witness whereof I have hereunto signed my name in the presence of two subscribing witnesses.

JAMES J. WOOD.

Witnesses:
EDWARD A. WAGNER,
EDWARD A. BARNES.